June 15, 1954  K. G. WOOD  2,680,994
SUCTION HOLDING DEVICE
Filed Oct. 22, 1951

INVENTOR.
KENNETH G. WOOD
BY
AGENT

Patented June 15, 1954

2,680,994

UNITED STATES PATENT OFFICE 2,680,994

SUCTION HOLDING DEVICE

Kenneth G. Wood, Seattle, Wash., assignor to Boeing Airplane Company, Seattle, Wash., a corporation of Delaware Application October 22, 1951, Serial No. 252,546

13 Claims. (Cl. 90—59)

This invention relates to suction holding devices employed to position materials securely during processing operations and more particularly concerns improvements in valve assemblies fitted at spaced intervals into chucks, work tables and other smooth mounting surfaces composed of one or more planes.

The purpose of this invention is to provide a novel valve assembly operable only upon direct contact of the material that is to be machined or otherwise processed, permitting variable size pieces of material to be efficiently handled on the same extended holding area.

In the assembly there is a hollow plunger which partially protrudes above the receiving surface. As the plunger lowers under the weight of a work piece and an additional force, if necessary, its inserted stem portion acts against the resiliency of a moulded rubber valve. The valve as it is deflected moves away from an aperture interconnecting the hollow plunger chamber with the vacuum system, permitting extraction of the air. The plunger and the valve are retained in this cooperating relationship with one another by their complementary surfaces and by their retention in the formed central bore of a valve housing which is inserted in the supporting structure of the mounting surface.

The purpose and operation of this novel work holder will become more apparent from the following description made in reference to the figures of the drawing wherein like numerals denote the same part throughout the views.

Figure 1:
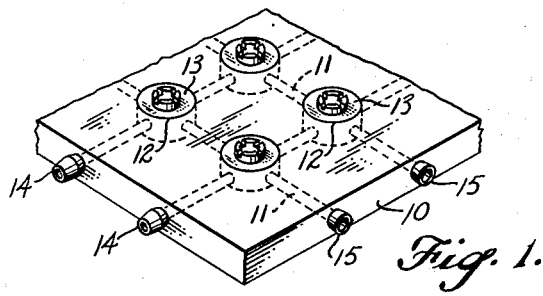
Figure 1 is a perspective view of a corner portion of the suction holding device.

More particularly, the inventive valve assembly is incorporated into a material holding member 10 as shown in Figures 1 through 5 inclusive. A vacuum system composed of passageways 11 is arranged in the member 10 permitting the spacing of recesses 12 to accommodate valve housings 13. Where the passageways emerge from the interior of member 10, they are fitted with adaptors 14 for attachment to exterior air lines (not shown) or plugs 15 where the additional access is not required.

Figure 7:
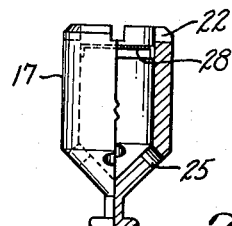
Figure 7 is an elevation, partially in section, of the plunger.
Figure 2:
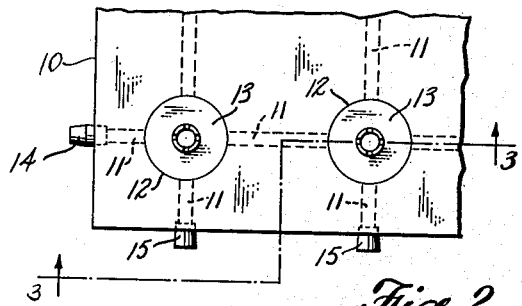
Figure 2 is a plan view of a portion of the suction holding device.
Figure 8:
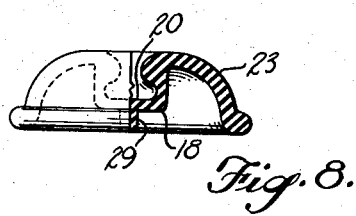
Fig. 8 is an elevation, partially in section, of the valve.
Figure 3:
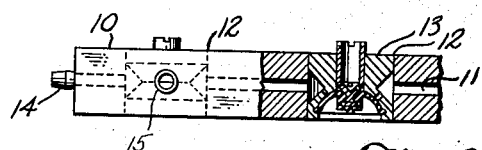
Figure 3 is an elevation, partially in section, of Figure 2 on line 3—3.
Figure 6:
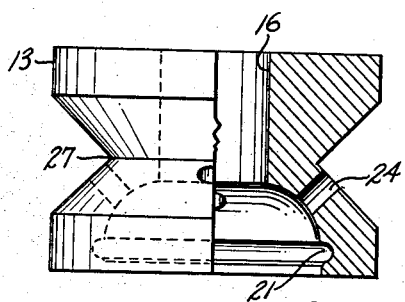
Figure 6 is an elevation, partially in section, of the valve housing.

The housing 13, Figure 6, has a spool-like appearance with the mid-portion of its exterior reduced in diameter providing a chamber 27 to assure continued air flow in the member 10 around the valve assembly whether the valve is open or closed. The interior of the housing 13 has a continuous central bore with the upper portion 16 serving as a guide for the hollow plunger 17 of Figure 7 and the lower portion 21 serving as a complementary recess to retain the ribbed moulded rubber valve 18 of Figure 8. There are apertures 24 in the housing's lower portion 21 circumferentially spaced in the crown of the recess to interconnect the central bore of the housing with its external chamber 27.

The plunger 17 is slidably inserted into the upper portion 16 of the central bore of the housing 13. It has an upper hollow slotted end 22 which is held above the member 10 by the resilient force of the valve 18. The hollow portion of the plunger terminates beyond its midpoint by merging into a bulb type stem portion 19. The contour of this portion 19 permits its insertion by hand into a specially formed elastic recess 20 on the top of the valve 18. This assembly makes the valve and plunger an operational unit permitting the direct transfer of movement from one to the other. Where the plunger's hollow portion terminates, apertures 25 are circumferentially spaced interconnecting the hollow portion of the plunger 17 with the central bore of the housing 13.

The valve 18 is made of moulded rubber in an inverted dish shaped form to fit the recessed lower portion 21 of the housing 13. Its crowned portion 23 mates the housing's surface at the apertures 24 sealing them effectively. Its top outer center portion contains the recess 20 which receives the lower stem portion 19 of the plunger 17, as noted previously. When desired its flexibility and strength may be varied by the addition of rib members 29 spaced circumferentially.

The valve 18 is first assembled with the plunger 17. Then the unit is inserted within the housing 13 until the valve 18 elastically expands into the formed recess 21. This entire assembly is accomplished by hand without the aid of tools which guarantees ease in making repairs and replacements as well as the convenience in the original manufacture.

After final assembly when the pressure is reduced in the chamber 27 in the exterior of the housing 13, the valve at its crowned portion 23 is even more securely drawn across the apertures 24 by the differential in pressure on the top and bottom surfaces of the valve 18.

To protect the entire assembly from the entrance of foreign matter such as metal chips from the machining operations, a perforated filter 28 is inserted within the plunger 17 at its hollow slotted end 22. Other particles and substances that may evade this filter 28 are easily withdrawn by conveniently removing the valve-plunger unit by hand.

Before use, a suction holding device embodying the inventive valve assembly appears as a smooth supporting surface interrupted by spaced uniformly projecting plungers 17 held in their protruding position by the resiliency of the valves 18. In this non-use position, the valve 18 is effectively sealing the apertures 24, isolating the hollow plunger from the passageways 11 which are reduced below atmospheric pressure by a conventional means connected at the adaptors 14.

Figure 4:
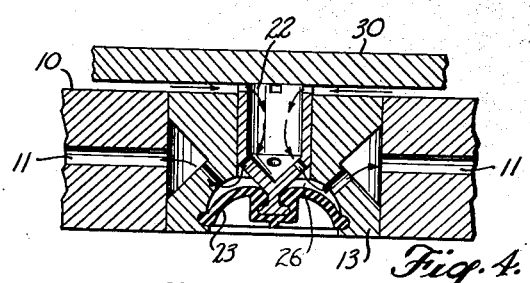
Figure 4 is an elevation, in section, of the valve assembly with the material placed over it.
Figure 5:
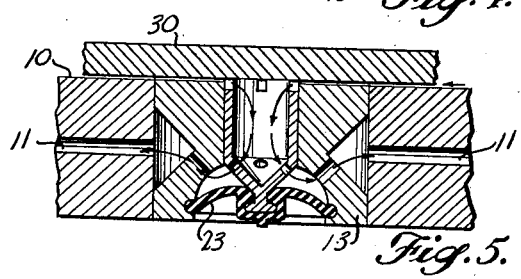
Figure 5 is an elevation, in section, of the valve assembly with the material held in position.

When in use, only those plungers 17 which are located beneath the processed material 30 will be depressed, the remaining area of the member 10 continuing to be isolated from the vacuum system. The downward movement of the plungers 17 that are located beneath the material 30 is illustrated in Figures 4 and 5. Figure 4 shows the air flow (by arrows) at the commencement of the movement and Figure 5 depicts the limited air flow occurring while the material 30 is held during a processing operation.

This downward movement of the plungers 17 actuates their respective valves 18 uncovering the apertures 24 by deflecting the valves crowned portions 23. A new chamber or passageway 26 is formed by this deflection which interconnects the hollow plunger through its apertures 25 to the vacuum system through the housing aperture 24. Air is then withdrawn from beneath the material 30 through the slotted hollow end 22 into the plunger 17. It is then extracted through the apertures 25 into the new chamber 26 and out through the housing apertures 24 into the vacuum system.

With the air being extracted through the plungers 17 beneath the material 30, the differential in pressure holds the material 30 firmly in place during the processing operations until it is released by reducing the vacuum by a conventional means.

Figure 9:
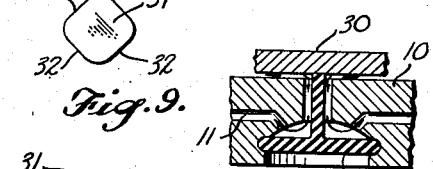
Fig. 9 is a top view of a modified plunger.
Figures 10, 11:
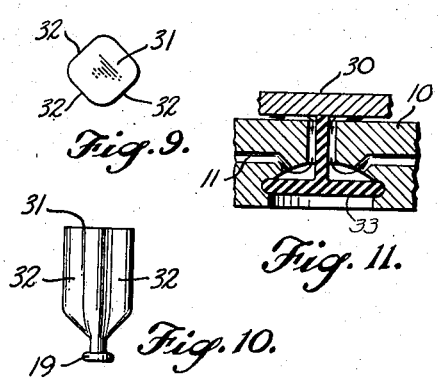
Fig. 10 is a side view of the modified plunger of Figure 9.
Figure 11 is a view similar to Figure 4 of another embodiment.

Although the plunger 17 is hollow as shown in the preferred embodiment, it is feasible to employ a solid plunger 31, Figures 9 and 10, with surfaces 32 formed by cutting away exterior portions to define air passageways in conjunction with the upper bore 16 of the housing 13. Or the plunger and valve could be moulded together as an integral unit 33, Figure 11, to obtain a holding device having similar advantages.

To increase the efficiency of the various embodiments a non-lubricating sealing fluid is distributed over the holding surface of the member 10.

The invention can be utilized to convert or replace mechanical holding means that are still employed in preference to present suction devices that are not universally adapted to hold irregular sizes and forms of the materials.

Having now particularly described and ascertained the nature of my invention, and in what manner the same is to be performed, I declare that what I claim is:

1. A suction holding device employed to position materials securely during processing operations, comprising a material receiving member having spaced recesses interconnected by passageways, apertured valve housings with a central bore and an external mid-section of reduced diameter fitted into the recesses of the said receiving member, hollow apertured plungers slidably inserted in the central bores of the said housings, a moulded rubber valve elastically retained within each said housing, a stem end on each said plunger fitted into each said valve for transmitting motion of the plunger to the valve to create a continuous extraction air passage from the hollow apertured plunger through the apertured housing into the passageways.

2. A vacuum holding means comprising an apertured housing having a formed central bore, an apertured plunger slidably inserted in the housing with one hollow and slotted end and its other first inserted end converging into a stem, an elastic valve member fitted within the bore of the said housing covering the apertures and around the said plunger stem holding the said hollow end above the said housing until it is depressed by the weight of the material to be held, thereby actuating the said valve to uncover apertures through which air is extracted from the hollow plunger to the exterior of the said housing maintained below atmospheric pressure.

3. A suction cup assembly for installation in a suction holding device comprising a housing having an upper central bore cylindrically formed, a lower connecting central bore semi-spherically formed and apertures through the lower portion of the said housing, the housing exterior shaped like a spool with a reduced mid-section, an elastic valve of dish form received in the said lower bore and having a central elastic ring at its apex, a protruding hollow plunger slidably mounted in said upper central housing bore having a bulb-stem extending downwardly and secured within the ring of the valve, and apertures adjacent to the said stem whereby downward movement of the said plunger deflects the said valve uncovering the said housing apertures so air may be extracted from the said hollow plunger through its apertures and through the housing into a suction system of the holding device.

4. A suction holding device comprising a work piece support member containing air passageways interconnecting spaced holes in its top surface, apertured spool type housings inserted in the said support member their reduced exterior diameter forming a chamber in conjunction with the hole surfaces and their central bores serving as guides and retaining means, a moulded dish-shaped recessed elastic valve expanded within a complementary central bore portion of each said spool housing sealing the spool apertures, an apertured hollow protruding plunger slidably mounted in each said spool housing above the said valve, a bulb-like stem end terminating each hollow portion of each said plunger below the plunger apertures interfitting with the valve recess for transmitting the motion of the said plunger to the valve to open the housing apertures permitting extraction of air through the hollow plunger.

5. A suction device for holding surfaces of articles comprising a contact operated apertured hollow plunger protruding above a holding surface, an elastic valve contacting the nonprotruding end of the said plunger, an apertured spool-type housing serving as a guide for the said plunger and retainer for said valve, the said valve sealing the housing apertures until deflected by the said plunger thereby establishing an air passageway from the interior of the said plunger to the source of vacuum available at the exterior of the said housing.

6. A suction device for holding surfaces of material to be processed comprising a material receiving part containing a vacuum source, valve housing inserts spool-shaped and apertured to serve as a bypass and a conductor for the vacuum source, an apertured protruding hollow end stem plunger slidably mounted in the top of each said housing inserts, an elastic cup valve mounted in the bottom of each said housing sealing the apertures, each said stem plunger and said valve interfitted so the plunger action deflects the valve away from the housing apertures connecting the said plunger to the vacuum source.

7. In a suction system for holding surfaces of articles to a work supporting member having a surface substantially conforming to the contour of the surface to be held, a suction valve assembly inserted in the said supporting member, comprising a contact operated hollow apertured plunger protruding above and slidably mounted in the said valve assembly, an apertured spool shaped housing of the said valve assembly to receive the plunger, an elastic dish-shaped valve complementary fitting the lower portion of the said housing sealing its apertures, deflection of the said valve by the said plunger opens the housing apertures for extracting air from the said apertured plunger through the said apertured housing into the vacuum source.

8. A suction work holder comprising a support member having spaced openings in its face and passageways interconnecting the openings, and inserted in each opening an assembly comprising a spool-like housing element having an upper cylindrical bore connected with a lower domed recess and apertures interconnecting the recess with the exterior of the housing, a dish-shaped valve element of rubber-like material received in the domed recess and normally closing said apertures, and a plunger received in the cylindrical bore connected to the valve and normally projecting beyond the upper end of the housing until deflected under the weight of a work piece to move the valve away from the housing apertures.

9. A suction work holder comprising a support member having spaced openings in its face and passageways interconnecting the openings, a spool-like housing element received in each opening, the housings each having an upper cylindrical bore connected with a lower domed recess and apertures interconnecting the recess with the exterior of the housing, a dish-shaped valve element of rubber-like material received in each domed recess and normally closing said apertures, and a multiple sided plunger received in each cylindrical bore and connected to the valve and normally projecting beyond the upper end of the housing until deflected by the weight of a work piece thereby removing the valve from the housing apertures.

10. A suction holding device employed to position materials securely during processing operations comprising a material receiving member having spaced recesses interconnected by passageways, the upper portions of the said recesses forming cylindrical spaces, the lower portions of the said recesses expanding into dome-shaped spaces with circular grooves, the said passageways emerging into the said dome recesses, and complementary crown-shaped valves elastically fitting the said dome spaces with integral projecting actuators extending up through the said cylindrical spaces for deflection under the weight of work pieces thereby moving the valves away from the passageway openings.

11. A suction holding device employed to position materials securely during processing operations comprising a material receiving member having spaced recesses interconnected by passageways, elastic valves fitting a portion of the said spaced recesses and sealing the said passageways, valve actuators extending upward through the said spaced recesses above the said material receiving member until lowered under the weight of the material thereby moving the said valves away from the openings of the said passageways.

12. A vacuum control assembly for use in a suction holding device comprising a hollow apertured retaining member; a resilient member elastically fitted within the said retaining member; an apertured projecting hollow plunger connected to said resilient member and guided in the said retaining member to deflect, when depressed, the said resilient member uncovering the apertures of the retaining member thereby establishing a fluid passageway from the exterior of the retaining member to the interior of the hollow plunger.

13. A suction holding device employed to position materials securely during processing operations comprising a material receiving member having spaced recesses interconnected by passageways, resilient members within the recesses covering the entrances of the passageways, and plungers partially inserted in the recesses contacting the resilient members and moving them clear of the entrances of the passageways when materials are placed on the suction holding device thereby establishing a continuous air withdrawal passageway from the material being held to a vacuum source withdrawing air from the interconnecting passageways throughout the material receiving member.

References Cited in the file of this patent

UNITED STATES PATENTS

| Number | Name | Date |
| --- | --- | --- |
| 1,588,012 | Carrie | June 8, 1926 |
| 2,198,765 | Featherstone et al. | Apr. 30, 1940 |
| 2,597,543 | Suben | May 20, 1952 |

FOREIGN PATENTS

| Number | Country | Date |
| --- | --- | --- |
| 120,697 | Great Britain | Oct. 10, 1917 |